US012788651B2

(12) United States Patent
Zerhusen

(10) Patent No.: US 12,788,651 B2
(45) Date of Patent: Nov. 10, 2026

(54) HOSPITAL BED ALERT LIGHT MANAGEMENT

(71) Applicant: Hill-Rom Services, Inc., Batesville, IN (US)

(72) Inventor: Robert Mark Zerhusen, Batesville, IN (US)

(73) Assignee: Hill-Rom Services, Inc., Batesville, IN (US)

( * ) Notice: Subject to any disclaimer, the term of this patent is extended or adjusted under 35 U.S.C. 154(b) by 97 days.

(21) Appl. No.: 18/240,397

(22) Filed: Aug. 31, 2023

(65) Prior Publication Data

US 2024/0074926 A1 Mar. 7, 2024

Related U.S. Application Data

(60) Provisional application No. 63/403,116, filed on Sep. 1, 2022.

(51) Int. Cl.
*A61G 7/05* (2006.01)

(52) U.S. Cl.
CPC ........ *A61G 7/0524* (2016.11); *A61G 2203/20* (2013.01); *A61G 2203/30* (2013.01)

(58) Field of Classification Search
CPC .............. A61G 7/0524; A61G 2203/20; A61G 2203/30; A61G 7/00; G16H 10/60; G16H 20/30; G16H 40/67; G16H 40/63
See application file for complete search history.

(56) References Cited

U.S. PATENT DOCUMENTS

| | | | | |
|---|---|---|---|---|
| 9,655,798 | B2 * | 5/2017 | Zerhusen | A61G 7/05 |
| 10,098,593 | B2 | 10/2018 | Collins, Jr. et al. | |
| 10,206,836 | B2 | 2/2019 | Zerhusen | |
| 10,632,033 | B1 | 4/2020 | Walton et al. | |
| 11,123,246 | B2 | 9/2021 | Sidhu et al. | |
| 11,135,110 | B2 | 10/2021 | Walke et al. | |
| 11,172,892 | B2 | 11/2021 | Turner et al. | |
| 11,246,776 | B2 | 2/2022 | Moreno et al. | |
| 2004/0046668 | A1 | 3/2004 | Smith et al. | |
| 2005/0081300 | A1 | 4/2005 | O'Reagan et al. | |
| 2006/0162076 | A1 | 7/2006 | Bartlett et al. | |

(Continued)

FOREIGN PATENT DOCUMENTS

| | | | |
|---|---|---|---|
| WO | 2007019691 | A1 | 2/2007 |
| WO | 2020131851 | A1 | 6/2020 |

(Continued)

OTHER PUBLICATIONS

PCT Search Report, PCT/US2023/031594 Jan. 11, 2024.
Extended Search Report, Application No. 23861257.6-113. Dated Jul. 8, 2026.

*Primary Examiner* — Justin C Mikowski
*Assistant Examiner* — George Samuel Gines
(74) *Attorney, Agent, or Firm* — Barnes & Thornburg LLP

(57) ABSTRACT

A patient support apparatus comprises a plurality of components including siderails and a control system. The ability of the patient support apparatus to automatically determine compliance with a therapy may be important to prevent any potential harm to patients. The control system includes a controller operable to monitor the position, angle, activity, or other attributes from each component of the patient support and communicate to the caregiver.

19 Claims, 7 Drawing Sheets

(56) References Cited

U.S. PATENT DOCUMENTS

| | | | | |
|---|---|---|---|---|
| 2007/0174965 | A1 | 8/2007 | Lemire et al. | |
| 2016/0166453 | A1* | 6/2016 | Furman | A61G 7/018 700/275 |
| 2019/0029900 | A1* | 1/2019 | Walton | A61G 7/015 |
| 2019/0336367 | A1* | 11/2019 | Zerhusen | A61G 7/05776 |
| 2020/0163818 | A1 | 5/2020 | Theunick et al. | |
| 2020/0188204 | A1* | 6/2020 | Newkirk | G06F 3/04842 |
| 2020/0306127 | A1* | 10/2020 | Benz | A61H 9/0071 |
| 2021/0128382 | A1 | 5/2021 | Zerhusen | |
| 2021/0369522 | A1 | 12/2021 | Nahavandi et al. | |
| 2021/0393460 | A1* | 12/2021 | Sidhu | G16H 40/20 |
| 2022/0054337 | A1 | 2/2022 | Tallent et al. | |

FOREIGN PATENT DOCUMENTS

| | | | | |
|---|---|---|---|---|
| WO | 2020264069 | A1 | 12/2020 | |
| WO | WO-2020264140 | A1 * | 12/2020 | A61B 5/002 |
| WO | 2022056343 | A1 | 3/2022 | |

* cited by examiner

HOSPITAL BED ALERT LIGHT MANAGEMENT

CROSS-REFERENCE TO RELATED APPLICATIONS

This application claims priority under 35 U.S.C. § 119(e) to U.S. Provisional Application No. 63/403,116, filed Sep. 1, 2022, which is expressly incorporated by reference herein.

BACKGROUND

The present disclosure relates to the use of sensors of a patient support apparatus, such as a hospital bed, for example, to determine a hierarchy of patient care protocols to be implemented. More specifically, the present disclosure is directed to a system or method for communicating a therapy operation protocol and determining if an alert is to be issued by the patient support apparatus.

Patient support apparatuses including mattresses, stretchers, operating room tables, and the like, are commonly used in a variety of care environments to facilitate patient care and transport. The patient support apparatuses are programmed with protocols to enable a user to perform a variety of automated functions relating to a patient support. Examples of such automated functions include raising or lowering one or more sections of the patient support, adjusting the configuration of a bed frame or support surface or a portion thereof, and activating or deactivating selected therapies, alarms, communications, and other automated features of the patient support.

Many such patient supports include a frame, a deck supported by the frame, a mattress, siderails configured to block egress of a patient from the mattress, and a controller configured to control one or more features of the bed. The patient, caregivers or visitors may intermittently change the position of the one or more components of the patient support apparatus during the course of the day. In some cases, it is important to determine the position of the one or more components relative to the patient support apparatus prior to the implementation of a therapy operation protocol. Additionally, sensors may be used to determine the position of the one or more components.

Monitoring the various components of the patient support apparatus may include monitoring for the position, angle, activity, or other attributes. A caregiver may be not be able to determine if the different components are not in compliance with a therapy operation protocol. The ability of the patient support apparatus to determine compliance automatically may prevent potential harms to patients. Thus, the characterization of the components of the patient support apparatus in light of any therapy operation protocol being communicated to the caregiver may provide improved care for the patient.

SUMMARY

The present disclosure includes one or more of the features recited in the appended claims and/or the following features which, alone or in any combination, may comprise patentable subject matter.

According to a first aspect of the present disclosure, a patient support apparatus comprises a plurality of apparatus components, a plurality of apparatus component sensors located on the plurality of apparatus components, a baseline operation protocol programmed on the patient support apparatus, a user interface operable to be programmed with a therapy operation protocol, and a control system including a controller in communication with the plurality of apparatus component sensors operable to determine if the therapy operation protocol is in compliance with the baseline operation protocol.

In some embodiments of the patient support apparatus, the controller may function as a protocol conflict manager.

In one embodiment of the patient support apparatus, if the control system determines that the therapy operation protocol is not in compliance with the baseline operation protocol, the therapy operation protocol supersedes the baseline operation protocol and the control system is further operable to communicate with the plurality of apparatus component sensors to ensure compliance with the therapy operation protocol.

In one embodiment of the patient support apparatus, a compliance status of the patient support apparatus with the therapy operation protocol is projected on the floor. In some embodiments of the patient support apparatus, the plurality of apparatus components is a plurality of siderails, and the controller is operable to receive a separate signal from each of the plurality of apparatus component sensors to determine if each of the plurality of siderails are up or down, and the controller is further operable to process the signals to determine if there is compliance with the therapy protocol.

In one embodiment of the patient support apparatus, the therapy operation protocol is a CLR (continuous lateral rotation) protocol, and the baseline operation protocol comprises a baseline siderail protocol. In some embodiments, the CLR protocol comprises having four siderails in an up position, and the baseline siderail protocol comprises having two siderails in an up position. In some embodiments, the CLR protocol supersedes the baseline siderail protocol, and if the patient support apparatus is not in compliance with the CLR protocol, the controller projects a warning sign on the floor. In some embodiments, the warning sign is a non-compliance indication of the patient support apparatus with the CLR protocol.

In one embodiment of the patient support apparatus, the CLR protocol supersedes the baseline siderail protocol, and if the controller determines that the patient support apparatus does not have four siderails in an up position, the user interface displays a warning sign. In some embodiments, the CLR protocol comprises determining the status of other components of the patient support apparatus.

In one embodiment of the patient support apparatus, the user interface is operable to be programmed manually or remotely.

According to a second aspect of the present disclosure, a system comprises a patient support apparatus including a head end and a foot end, a plurality of patient support components, an indicator light at the foot end, and a controller operable to communicate with a plurality of patient support components, and the indicator light. The controller is operable to receive a separate signal from each of the plurality of patient support components, to process the signals to determine a position of each of the patient support components, and a user interface operable to be programmed with a baseline operation protocol and therapy operation protocol.

In some embodiments of the system, the controller may function as a protocol conflict manager.

In one embodiment of the system, the controller is operable to process the signals to determine if there the therapy operation protocol is in compliance with the baseline operation protocol. In some embodiment of the system, if the control system determines that the patient support apparatus is not in compliance with the therapy operation protocol, the control system is further operable to communicate with the plurality of apparatus component sensors to ensure compliance with the therapy operation protocol.

In one embodiment of the system, the indicator light projects a compliance status of the patient support apparatus on the floor, and the compliance status is based on the therapy operation protocol.

In one embodiment of the system, the therapy operation protocol is a CLR protocol, and the user interface is operable to be programmed with the CLR protocol. In some embodiments, the CLR protocol supersedes a baseline operation protocol, and the CLR protocol comprises having four siderails in an up position. In some embodiments, the baseline operation protocol includes a siderail protocol that comprises having two siderails in an up position.

In one embodiment of the system, if the controller determines that the patient support apparatus does not have four siderails in an up position, the user interface is operable to display a warning sign. In some embodiments, if the controller determines that the patient support apparatus does not have four siderails in an up position, a non-compliance indication of the patient support apparatus with the programmed siderail protocol is projected on the floor. In some embodiments, the CLR protocol further comprises determining the status of other components of the patient support apparatus.

In one embodiment of the system, the user interface is operable to be programmed manually or remotely.

According to a second aspect of the present disclosure, a method comprises monitoring compliance of a support apparatus with a therapy operation protocol. The method comprises the steps of inputting a baseline operation protocol into a user interface, monitoring signals from a plurality of apparatus component sensors, using a controller to process the signals from the plurality of apparatus component sensors, the apparatus component sensors located on a plurality of apparatus components, determining a position of the plurality of siderails based on the signals from the plurality of apparatus component sensors, and determining compliance of the position of the plurality of siderails with the patient protocol.

In one embodiment of the method, if the support apparatus is not in compliance with the patient protocol, the method comprises the controller communicating with the plurality of apparatus component sensors to ensure compliance with the programmed patient protocol. In another embodiment of the method, the method comprises automatically moving a portion of the support apparatus based on the signal from the apparatus component sensors to ensure compliance with the patient protocol. In one embodiment of the method, the method comprises projecting a compliance status of the support apparatus on the floor.

In some embodiments of the method, the controller may function as a protocol conflict manager.

In one embodiment of the method, the user interface is operable to be programmed with a CLR (continuous lateral rotation) protocol. In some embodiments, the method comprises the CLR protocol superseding a regular siderail protocol, and the CLR protocol comprises having four siderails in an up position. In some embodiments, if the controller determines that the patient support apparatus does not have four siderails in an up position, the method comprises the user interface displaying a warning sign.

In one embodiment of the method, if the controller determines that the patient support apparatus does not have four siderails in an up position, the method comprises projecting a non-compliance indication of the patient support apparatus with the programmed siderail protocol on the floor. In one embodiment of the method, the user interface is operable to be programmed manually or remotely.

Additional features, which alone or in combination with any other feature(s), such as those listed above and/or those listed in the claims, can comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
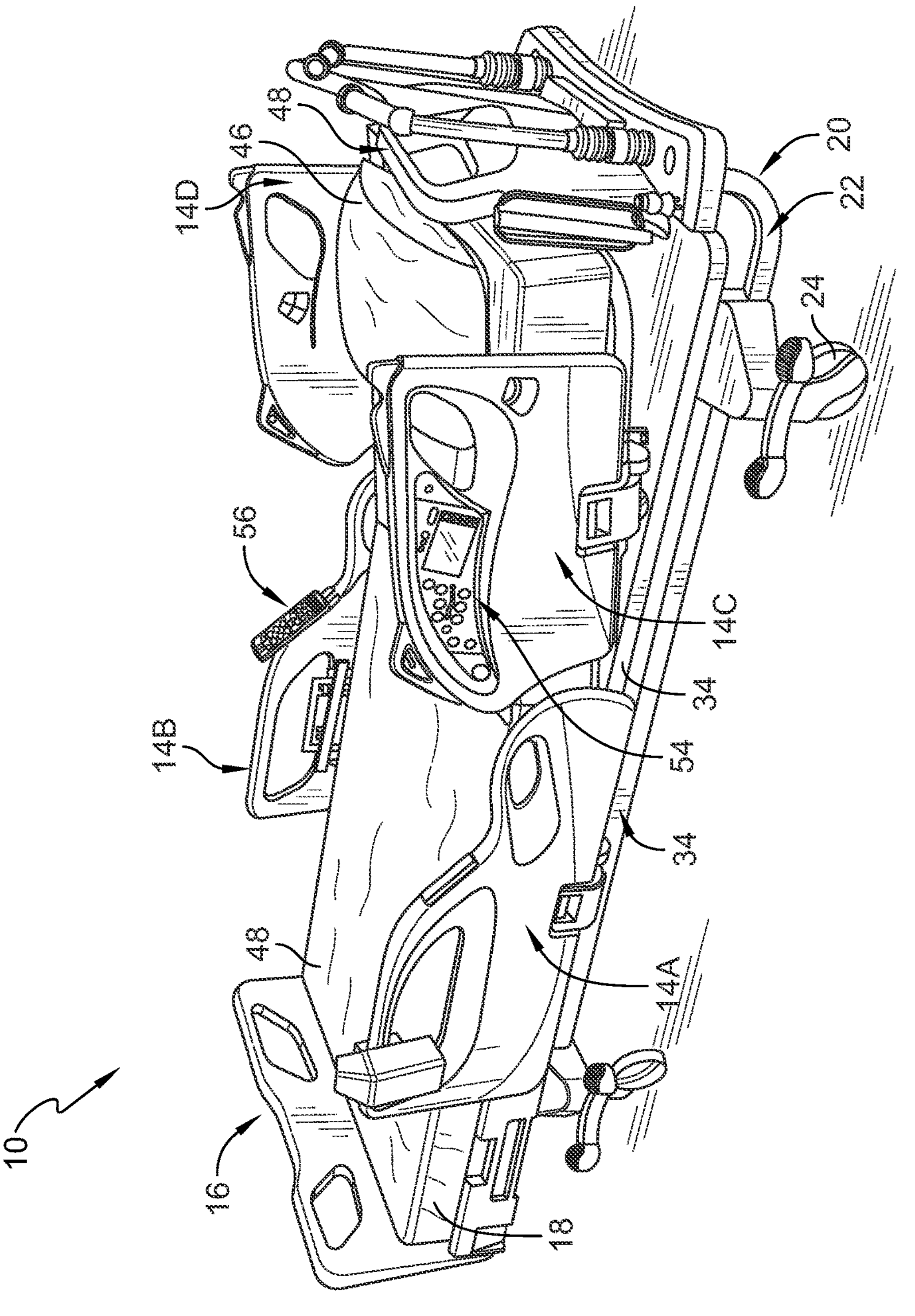
FIG. 1 is a perspective view of a patient support apparatus including a control system operable to measure signals from a plurality of sensors and process those signals according to the present disclosure.

An illustrative patient support apparatus 10 embodied as a hospital bed is shown in FIG. 1. The bed 10 of FIG. 1 has a frame 20 which includes a base frame 22 supported on casters 24. The stationary base frame 22 further supports a weigh frame 30 that an adjustably positionable mattress supporting upper frame 34 further supports a mattress 18. The bed 10 further includes a headboard 12 at a head end 46 of the bed 10, a footboard 16 at a foot end 48 of the bed 10, and movable siderails 14A-D coupled to the upper frame 34 of the bed 10. The bed 10 also includes a user interface 54 positioned on one of the siderails 14A-D. The bed 10 of the embodiment of FIG. 1 is conventionally configured to adjustably position the upper frame 34 relative to the base frame 22 to adjust the position of a patient supported on the mattress 18.

Conventional structures and devices may be provided to adjustably position the upper frame 34, and such conventional structures and devices may include, for example, linkages, drives, and other movement members and devices coupled between base frame 22 and the weigh frame 30, and/or between weigh frame 30 and upper frame 34. Control of the position of the upper frame 34 and mattress 18 relative to the base frame 22 or weigh frame 30 is controlled, for example, by a patient control pendant 56 or user interface 54. The upper frame 34 may, for example, be adjustably positioned in a general incline from the head end 46 to the foot end 48 or vice versa. Additionally, the upper frame 34 may be adjustably positioned such that the head section 44 of the mattress 18 is positioned between minimum and maximum incline angles, e.g., 0-65 degrees, relative to horizontal or bed flat, and the upper frame 34 may also be adjustably positioned such that a seat section (not shown) of the mattress 18 is positioned between minimum and maximum bend angles, e.g., 0-35 degrees, relative to horizontal or bed flat. Those skilled in the art will recognize that the upper frame 34 or portions thereof may be adjustably positioned in other orientations, and such other orientations are contemplated by this disclosure.

One or more components of the patient support apparatus may be communicated by icons 32 projected on the floor and/or icons 33 illuminated on a frame member of the bed 10. Examples of structures for projecting icons 32 on the floor or illuminating icons 33 on a frame are disclosed in WO2016196403A1 and US20180184984A1, each of which is incorporated by reference herein for the disclosure of structures used to project icons on the floor. The projected icons 32 can be used to indicate if a component of the patient support apparatus 10 is in compliance with a baseline operation protocol being used by the patient. In some embodiments, a siderail status of the patient support apparatus 10 may be communicated by icons 32 projected on the floor. The projected icons 32 can be used to indicate if the siderails 14A-D of the patient support apparatus 10 are in compliance with the baseline operation protocol. A therapy operation protocol may be programmed by a caregiver or user into the user interface 54.

Figure 2:
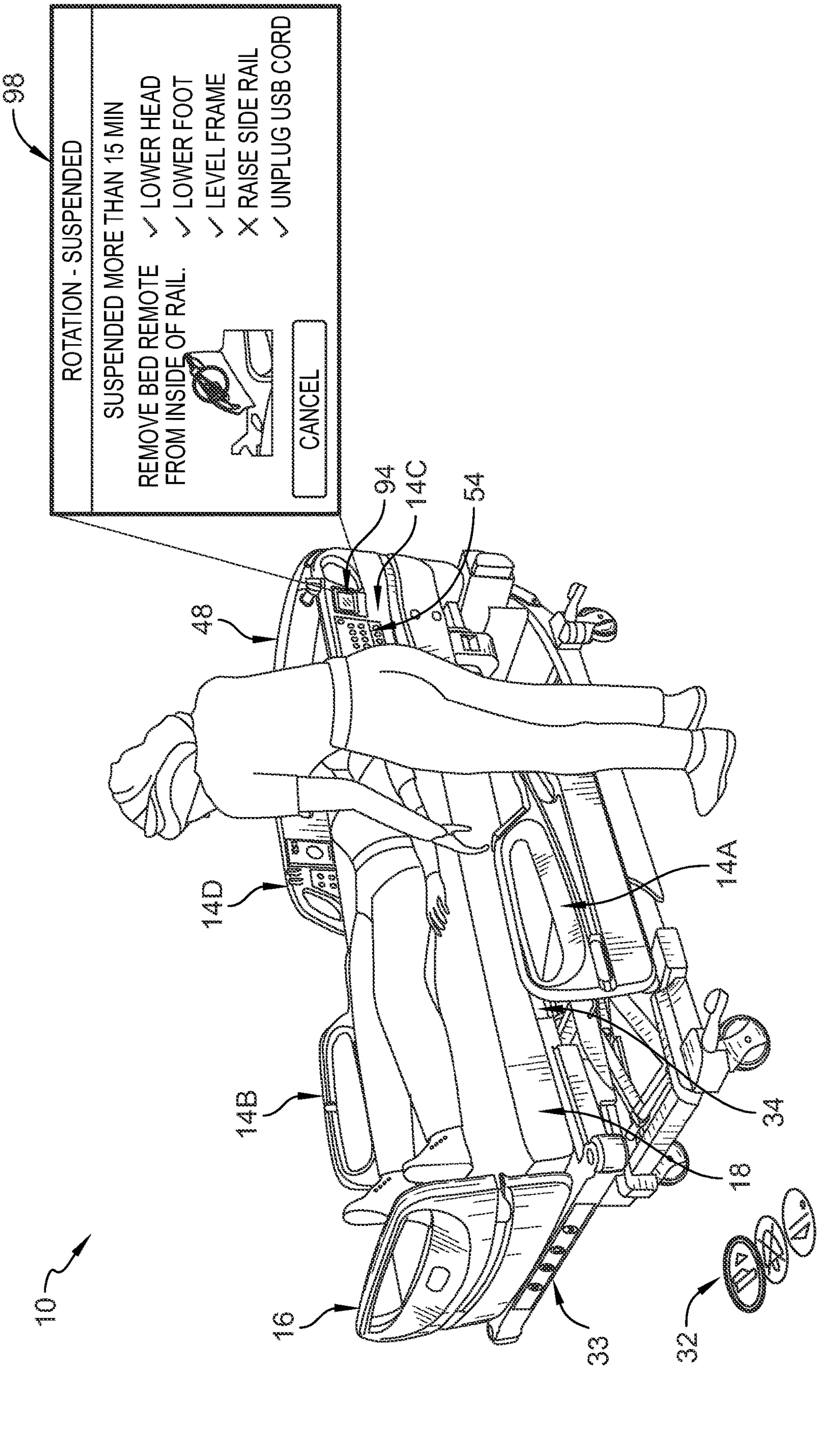
FIG. 2 is a diagrammatic illustration of warning signs not aligning with patient siderail protocol.

For example, the therapy operation protocol may be a CLR (continuous lateral rotation) protocol that requires all 4 siderails 14A-D to be raised prior to the commencement of CLR. Currently, caregivers face significant challenges taking care of patients on patient platforms with pulmonary therapies. Many of these therapies include rotation of the patient. Rotational therapy typically includes lateral rotation of a patient support apparatus 10 for patients needing pulmonary therapy or decubitus prevention or treatment. The rotatable support surface typically includes the mattress 18 on the hospital bed 10 that is laterally rotated by an air support system when all the siderails 14A-D are in an up position. As shown in FIG. 2, the projected icon 32 may not indicate a warning even if the patient support apparatus 10 is not in compliance with the therapy operation protocol but is in compliance will the baseline operation protocol. Though siderail 14A is lowered, the projected icon 32 is a green sign, indicating compliance. This effect may exist because of the difference in the requirements in the two protocols that are being used simultaneously: the baseline protocol defining nominal bed conditions and the therapy protocol that only applies selectively when a therapy is engaged. The present disclosure addresses the management of the inconsistent requirements of the simultaneously active protocols.

Figure 3:
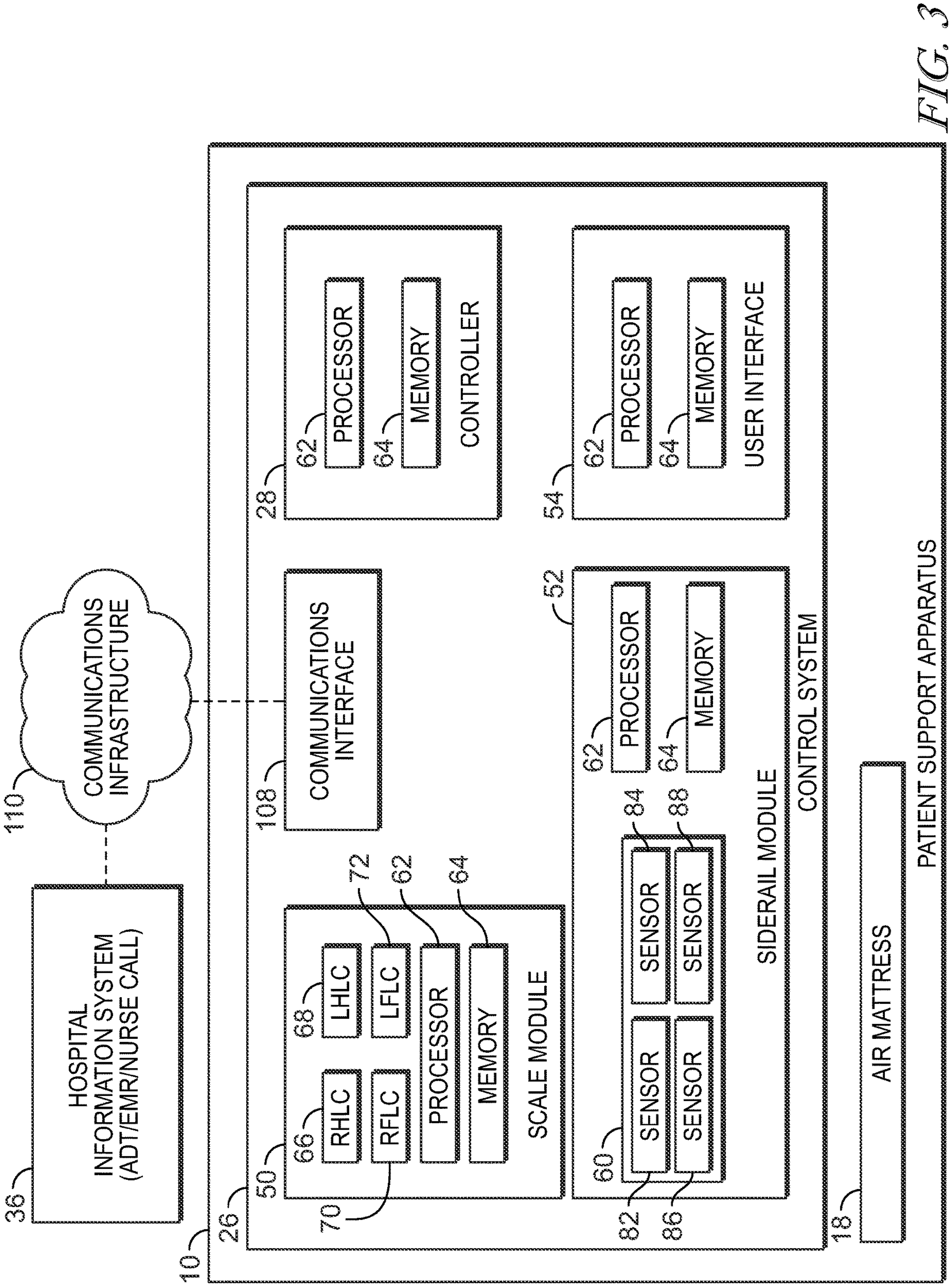
FIG. 3 is a block diagram of a portion of the control system of the patient support apparatus of FIG. 1.

In one illustrative embodiment shown diagrammatically in FIG. 3, the bed 10 has a control system 26 that includes a controller 28, a scale module 50, a component module (e.g., siderail module 52), and the user interface 54. The bed 10 can communicate with the hospital information system 36 via a communications infrastructure 110. The scale module 50 of the bed 10 is used for measuring the motions of a patient that occupies the bed 10 by measuring signals from load cells 66, 68, 70, 72. The siderail module 52 of the bed 10 is used for determining the operation of the siderails 14A-D by measuring signals from sensors 82, 84, 86, 88.

In the illustrative embodiment each of the controller 28, scale module 50, component module (e.g., siderail module 52) and user interface 54 includes a processor 62 and a memory device 64. The processor 62 and memory device 64 are used in the controller 28, the scale module 50, siderail module 52, and user interface 54. The memory device 64 includes instructions that, when executed by the processor 62, causes the processor 62 to perform functions as associated with the particular one of controller 28, scale module 50, siderail module 52, and user interface 54.

Figure 4:
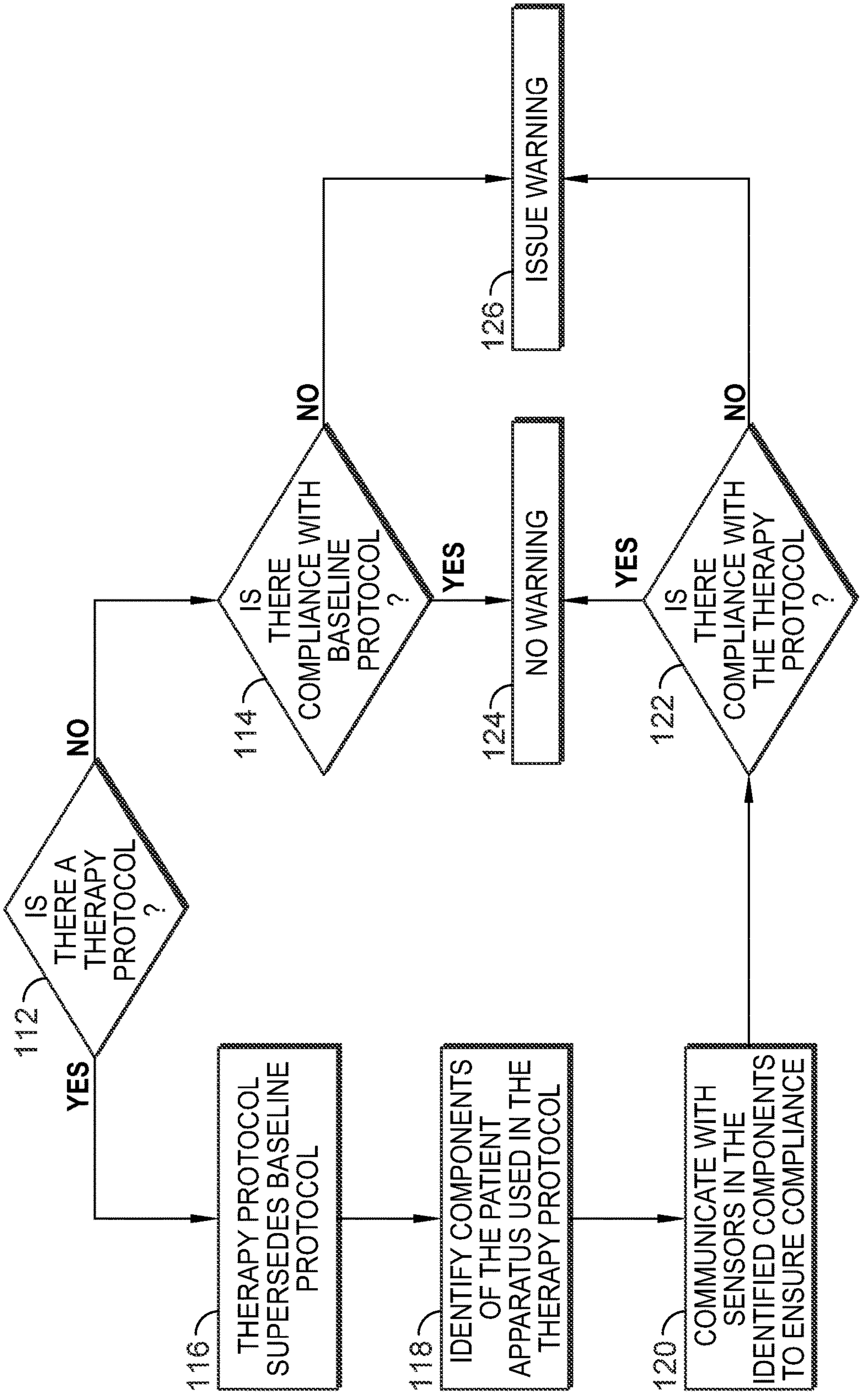
FIG. 4 is a decision tree executed by the control system to determine if a user interface has been programmed with a therapy operation protocol.

In some embodiments, a therapy operation protocol may necessitate a change in position of more than one components (e.g. siderails 14A-D, headend 48 etc.) of the bed 10. For example, a therapy operation protocol may require that the all the siderails 14A-D are in a certain position or that the headend 46 is at a certain angle. As shown in FIG. 4, the controller 28 is operable to act as a protocol conflict manager to execute a decision tree to determine if the user interface 54 has been programmed with a therapy operation protocol in step 112. If the user interface 54 has been programmed with a therapy operation protocol, the therapy operation protocol will supersede the baseline operation protocol in step 116. The controller 28 is then operable to identify the components (e.g. siderails 14A-D, headend 48 etc.) of the bed 10 that need a different orientation in the therapy operation protocol compared to the baseline operation protocol in step 118. The controller 28 is then operable to communicate with the sensors (e.g., sensors 82, 84, 86, 88) in the component module (e.g., siderail module 52) of the bed 10 that have been identified in step 120 to determine if they are in compliance with the therapy operation protocol.

If the components (e.g. siderails 14A-D, headend 48 etc.) of the bed 10 are determined to be in compliance with the therapy operation protocol in step 122, no warning or alert is issued in step 124. If the components (e.g. siderails 14A-D, headend 48 etc.) of the bed 10 are determined to not be in compliance with the therapy operation protocol in step 122, a warning or alert is issued in step 126. If the controller 28 determines that the user interface 54 has not been programmed with a therapy operation protocol in step 112, the controller 28 is operable to determine if the components (e.g. siderails 14A-D, headend 48 etc.) of the bed 10 are in compliance with the baseline operation protocol in step 114. If the components (e.g. siderails 14A-D, headend 48 etc.) of the bed 10 are determined to be in compliance with the baseline operation protocol in step 114, no warning or alert is issued in step 124. If the components (e.g. siderails 14A-D, headend 48 etc.) of the bed 10 are determined to not be in compliance with the baseline operation protocol in step 114, a warning or alert is issued in step 126.

The components of the control system 26 communicate amongst themselves to share information and distribute the functions of the bed 10. The processor 62 of each of the controller 28, scale module 50, component module (e.g., siderail module 52), and user interface 54 is also operable, based on instructions from the memory device 64, to communicate with the others of the controller 28, scale module 50, component module (e.g., siderail module 52), and user interface 54 using a communications protocol. It should be understood that the term processor here includes any microprocessor, microcontroller, processor circuitry, control circuitry, preprogrammed device, or any structure capable of accessing the memory device and executing non-transient instructions to perform the tasks, algorithm, and processed disclosed herein. In the illustrative embodiment, the control system 26 employs a conventional controller area network (CAN) for communications between subsystems, but it should be understood that any of a number of networking and communications solutions could be employed in the control system 26.

Referring back to FIG. 3, the siderail module 52 is the functional controller for the siderails 14A-D and includes processor 62 and a memory device 64. The processor 62 is in communication with the siderails 14A-D. The sensor assembly 60 includes separate sensors for determining the position of each of the siderails 14A-D. Signals from the sensors 82, 84, 86, and 88 are used to determine the position of the siderails 14A-D and to make inferences regarding compliance with any patient siderail protocol that may have been entered by a user on the patient interface 54. Such determination will increase patient safety and provide a more fulsome and accurate analysis of patient condition as associated with the patient support apparatus. In addition, the bed 10 may log the presence of the therapy operation protocol and send the data to an electronic medical record. As shown in FIG. 2, the therapy operation protocol may be indicated on the user interface 54. The display screen 94 may include a status board 98 indicating that if a therapy has been stopped because of non-compliance with the therapy operation protocol. The status board 98 may include additional information.

Figure 5:
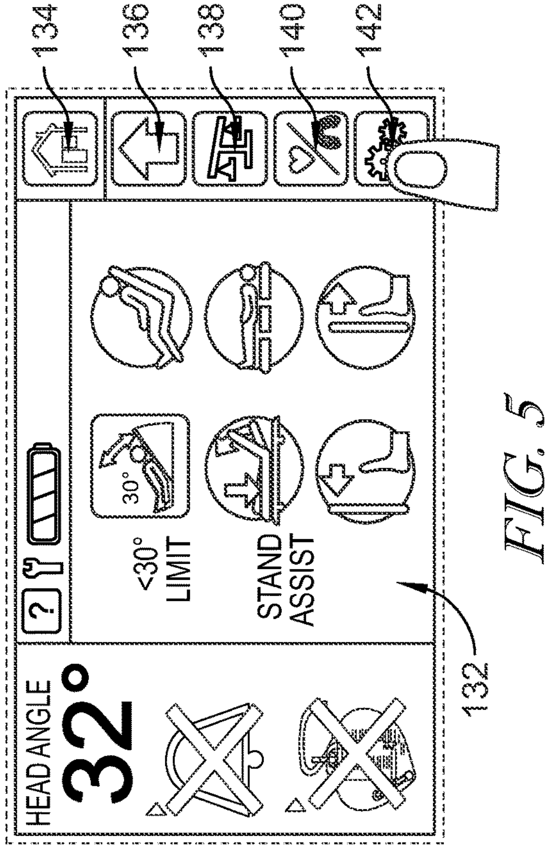
FIG. 5 is an illustration of one embodiment of a display screen including a home icon, a rest icon, a sleep data icon, a movement icon, and a help icon.

The display screen 94 of the user interface 54 may include more than one input icons. As show in FIG. 5, the home screen 132 on the display screen 94 includes a home icon 134, an up movement icon 136, a balance icon 138, a physiological icon 140, and a settings icon 142. The controller 28 receives user input commands from graphical display screen 94 when any icon is activated. Based on the user input commands on the display 94 and the data processed by the processor 62, the controller 28 controls various functions of bed 10 such as the pneumatic system and/or raising or lowering different of the bed 10. In some embodiments, based on the user input commands on the display 94 and the data processed by the processor 62, the controller 28 controls the functions of one or more of actuators in the bed 10. In some embodiments, based on the user input commands on the display 94 and the data processed by the processor 62, the controller 28 controls functions of the siderails 14A-D.

Figure 6:
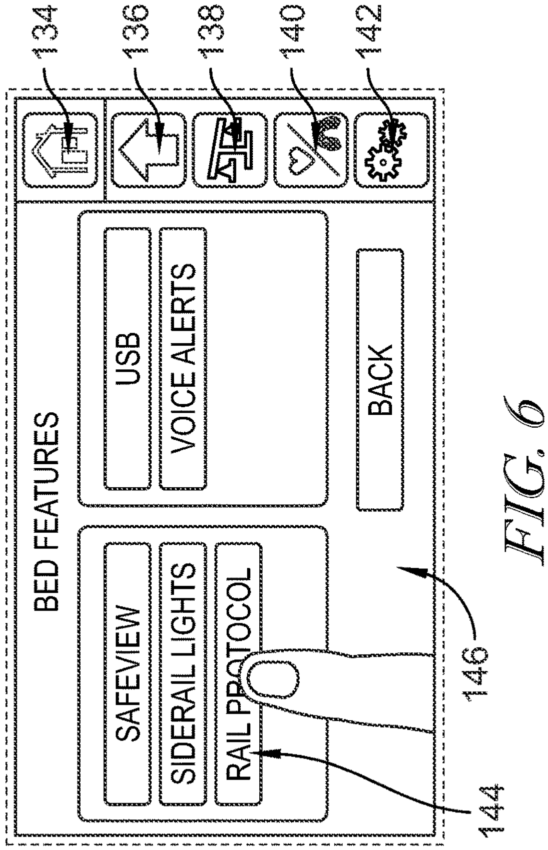
FIG. 6 is an illustration of one embodiment of a display screen including a rail protocol icon.
Figure 7:
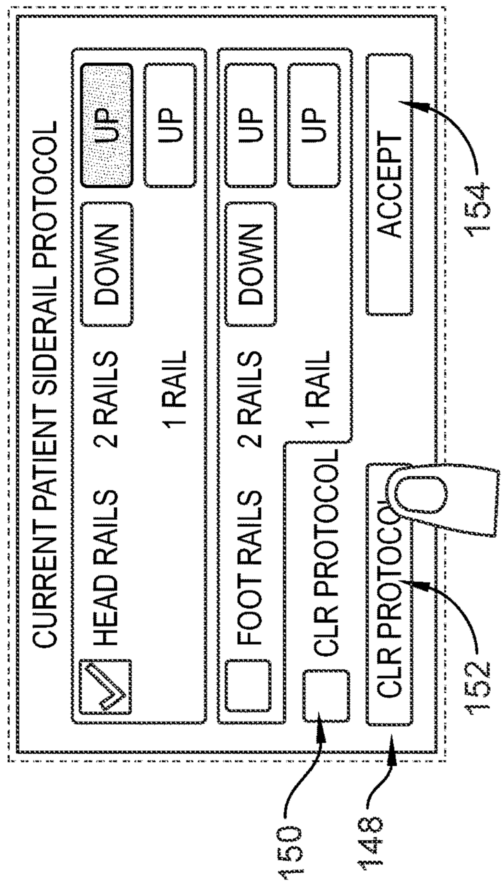
FIG. 7 is an illustration of one embodiment of a current rail protocol screen shown upon activation of the rail protocol icon.
Figure 8:
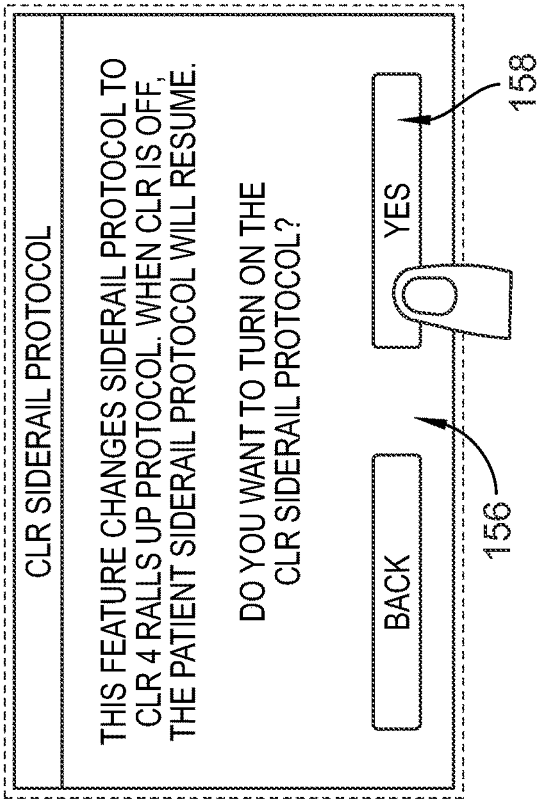
FIG. 8 is an illustration of one embodiment of an information screen upon activation of a CLR protocol information icon.
Figure 9:
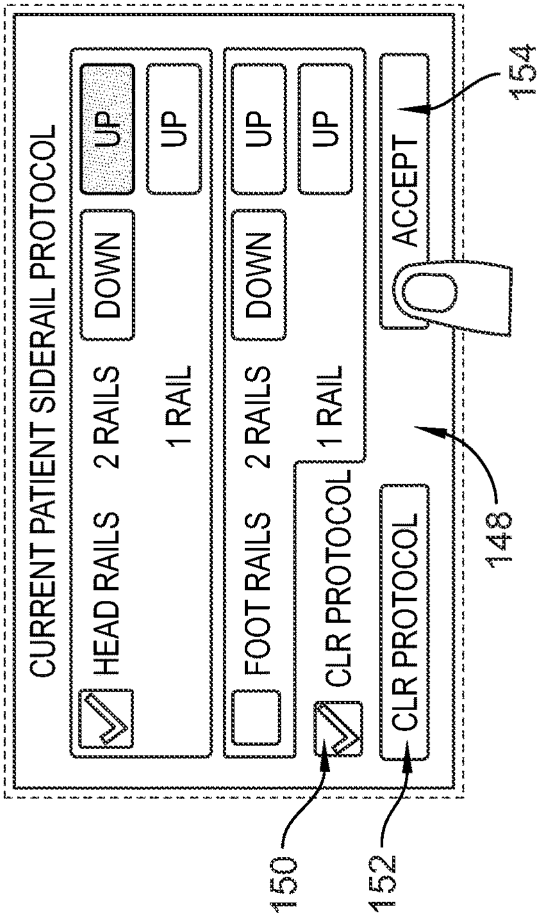
FIG. 9 is an illustration of one embodiment of a current rail protocol screen showing a checked CLR protocol icon.

As shown in FIG. 6, when a caregiver activates the settings icon 142, the controller 28 prompts the caregiver to select bed features on the features screen 146. As shown in FIG. 7, the rail protocol icon 144 (shown in FIG. 6) may be activated by a caregiver to cause the controller 28 to call up a current rail protocol screen 148. The current rail protocol screen 148 of the user interface 54 may list different therapy operation protocols that required certain siderail 14A-D positions including CLR protocol. The current rail protocol screen 148 includes a CLR protocol information icon 152 which may be activated by a caregiver to cause the controller 28 to display information about the CLR protocols shown on the information screen 156 in FIG. 8. Selecting the yes icon 158 on the information screen 156 activates the CLR protocol. Referring to FIG. 9, when a caregiver activates the yes icon 158 on the information screen 156, the CLR protocol icon 150 on the current rail protocol screen 148 is checked. The controller 28 is operable to recognize the CLR protocol as a therapy operation protocol that supersedes any baseline operation protocols. The caregiver can activate the accept icon on the current rail protocol screen 148 to confirm the selection of the CLR protocol.

Figure 10:
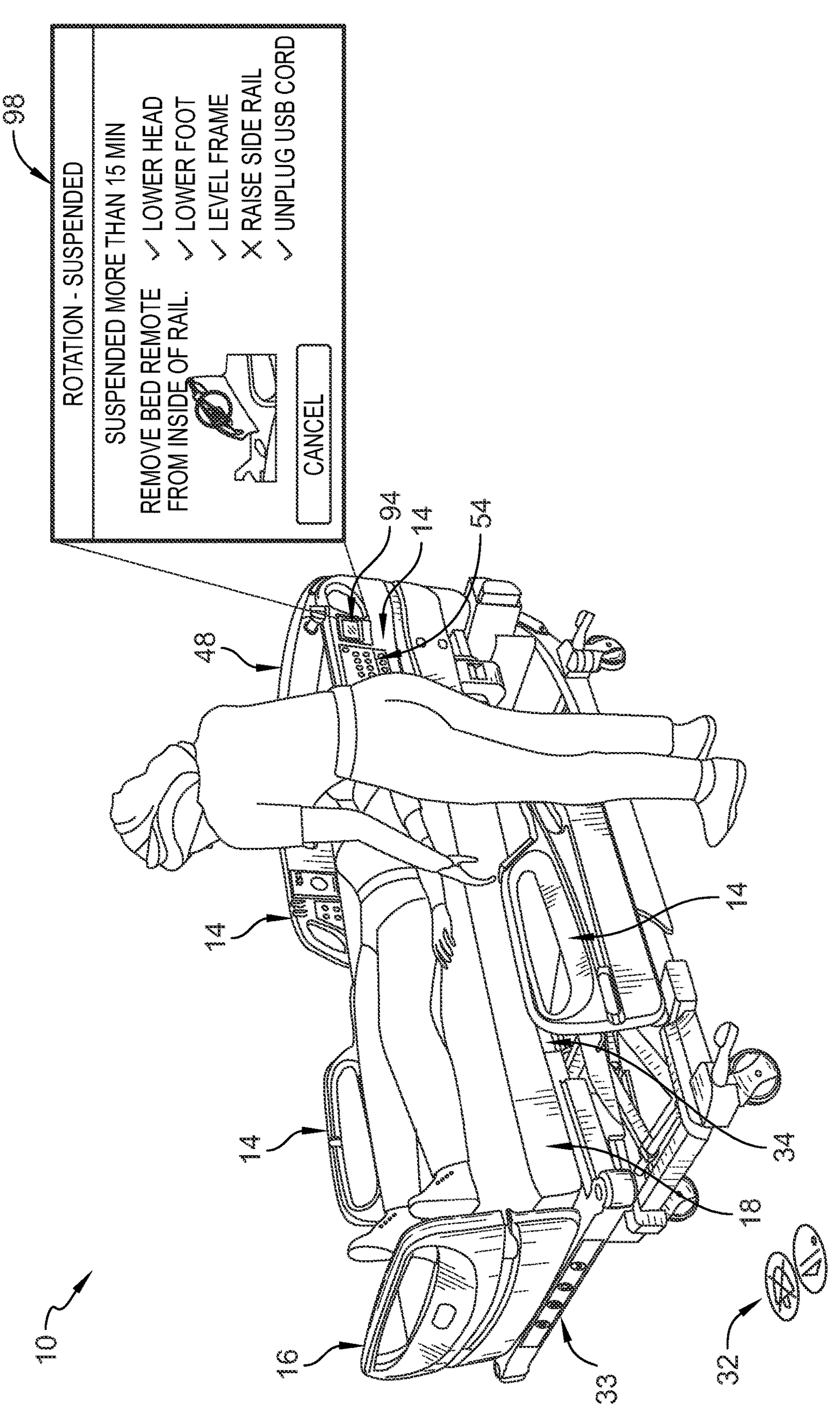
FIG. 10 is a diagrammatic illustration of side rail status aligning with the therapy operation protocol.

FIG. 10 illustrates that if the controller 28 is operable to determine that the therapy operation protocol supersedes the baseline operation protocol, the projected icon 32 may indicate a siderail status that shows that the bed 10 is not in compliance with the therapy operation protocol. In FIG. 10, because 14A is lowered, the projected icon 32 does not indicate compliance.

Although this disclosure refers to specific embodiments, it will be understood by those skilled in the art that various changes in form and detail may be made without departing from the subject matter set forth in the accompanying claims.

The invention claimed is:

1. A patient support apparatus comprising:

a plurality of apparatus components, a plurality of apparatus component sensors located on the plurality of apparatus components, a baseline operation protocol comprising a baseline siderail protocol programmed on the patient support apparatus, a user interface, and a control system including a controller in communication with the plurality of apparatus component sensors operable to be programmed with a therapy operation protocol, either manually or remotely, and if programmed with the therapy operation protocol, further operable to determine if the therapy operation protocol is in compliance with the baseline operation protocol, wherein the controller is operable to project a warning on the floor if the user interface has been programmed with the therapy operation protocol and the patient support apparatus is not in compliance with the therapy operation protocol, wherein the therapy operation protocol is a continuous lateral rotation (CLR) protocol that comprises having four siderails in an up position, the baseline siderail protocol comprises having less than four siderails in an up position.

2. The patient support apparatus of claim 1, wherein if the control system determines that the therapy operation protocol is not in compliance with the baseline operation protocol, the therapy operation protocol supersedes the baseline operation protocol and the control system is further operable to communicate with the plurality of apparatus component sensors to ensure compliance with the therapy operation protocol.

3. The patient support apparatus of claim 1, wherein a compliance status of the patient support apparatus with the therapy operation protocol is projected on the floor.

4. The patient support apparatus of claim 1, wherein the plurality of apparatus components is a plurality of siderails, and wherein the controller is operable to receive a separate signal from each of the plurality of apparatus component sensors to determine if each of the plurality of siderails are up or down, and the controller is further operable to process the signals to determine if there is compliance with the therapy protocol.

5. The patient support apparatus of claim 1, wherein a warning sign is a non-compliance indication of the patient support apparatus with the CLR protocol.

6. The patient support apparatus of claim 1, the CLR protocol supersedes the baseline siderail protocol, and wherein if the controller determines that the patient support apparatus does not have four siderails in an up position, the user interface displays a warning sign.

7. The patient support apparatus of claim 1, wherein the CLR protocol comprises determining the status of other components of the patient support apparatus.

8. A system comprising:

a patient support apparatus including a head end, a plurality of siderails, and a foot end, a plurality of patient support components, an indicator light at the foot end, and a controller operable to communicate with a plurality of patient support components and the indicator light, the controller operable to receive a separate signal from each of the plurality of patient support components, to process the signals to determine a position of each of the patient support components, the controller operable to be programmed with a baseline operation protocol comprising a baseline siderail protocol and a therapy operation protocol, and then if programmed with the therapy operation protocol, further operable to determine if the therapy operation protocol is in compliance with the baseline operation protocol, wherein the controller is operable to project a warning on the floor if the user interface has been programmed with the therapy operation protocol and all components of the patient support apparatus are not in compliance with the therapy operation protocol.

9. The system of claim 8, wherein if the control system determines that the patient support apparatus is not in compliance with the therapy operation protocol, the control system is further operable to communicate with the plurality of apparatus component sensors to ensure compliance with the therapy operation protocol.

10. The system of claim 8, wherein the indicator light projects a compliance status of the patient support apparatus on the floor, and wherein the compliance status is based on the therapy operation protocol.

11. The system of claim 8, wherein the therapy operation protocol is a continuous lateral rotation (CLR) protocol, and wherein the user interface is operable to be programmed with the CLR protocol.

12. The system of claim 11, wherein the CLR protocol supersedes a baseline operation protocol, and wherein the CLR protocol comprises having four siderails in an up position.

13. The system of claim 12, wherein the baseline siderail protocol comprises having less than four siderails in an up position.

14. The system of claim 13, wherein if the controller determines that the patient support apparatus does not have four siderails in an up position, the user interface is operable to display a warning sign.

15. The system of claim 13, wherein if the controller determines that the patient support apparatus does not have four siderails in an up position, a non-compliance indication of the patient support apparatus with the programmed siderail protocol is projected on the floor.

16. The system of claim 12, wherein the CLR protocol further comprises determining the status of other components of the patient support apparatus.

17. The system of claim 8, comprising a user interface operable to be used to program the controller manually or remotely.

18. The system of claim 8, wherein compliance with the therapy operation protocol requires compliance of the plurality of siderails and the head end of the patient support apparatus.

19. The system of claim 18, wherein compliance with the therapy operation protocol requires the plurality of siderails be positioned in an up position and the head end of the patient support apparatus be positioned at a given angle.

* * * * *